United States Patent

Shimura et al.

[11] Patent Number: 5,951,120
[45] Date of Patent: Sep. 14, 1999

[54] HYDRAULIC BRAKE CONTROL APPARATUS

[75] Inventors: Amane Shimura, Anjo; Hirohiko Morikawa, Toyota; Fumiaki Kawahata, Toyota; Kiyoharu Nakamura, Toyota; Akira Sakai, Toyota; Akihiro Ohtomo, Toyota, all of Japan

[73] Assignee: Toyota Jidosha Kabushiki Kaisha, Aichi-ken, Japan

[21] Appl. No.: 08/897,931

[22] Filed: Jul. 21, 1997

[30] Foreign Application Priority Data

Jul. 23, 1996 [JP] Japan .................................. 8-193465

[51] Int. Cl.[6] ..................................................... B60T 8/32
[52] U.S. Cl. .................................. 303/122.05; 303/116.1; 303/119.1; 303/901; 303/113.1; 303/166; 303/162
[58] Field of Search ........................ 303/122.05, 122.03, 303/900, 901, 13–14, 10–12, 166, 116.2, 115.2, DIG. 1, DIG. 2, DIG. 3, DIG. 4, 117.1, 162, 116.1–119.3, 113.1, 122.1, 122.09, 122.12, 122.13; 188/181 R, 181 C, 181 A, 352; 701/76, 92

[56] References Cited

U.S. PATENT DOCUMENTS

| 4,789,938 | 12/1988 | Maehata et al. .................... 303/122.05 |
| 4,812,277 | 3/1989 | Shirai . |
| 5,232,272 | 8/1993 | Berisch et al. ....................... 303/119.1 |
| 5,240,314 | 8/1993 | Morita . |

FOREIGN PATENT DOCUMENTS

| 4229041 | 3/1993 | Germany . |
| 19512254 | 10/1996 | Germany . |
| 4-243655 | 8/1992 | Japan . |
| 2253254 | 9/1992 | United Kingdom . |

OTHER PUBLICATIONS

"Electrohydraulic Brake System—The First Approach to Brake–By–Wire Technology" by Wolf–Dieter Jonner et al, SAE 960991, Feb. 1996.

"The Development and Testing of an Integrated Systems Demonstrator Vehicle" by S D Stevens BEng, Autotech 95 C498/35/157, 1995.

*Primary Examiner*—Douglas C. Butler
*Attorney, Agent, or Firm*—Kenyon & Kenyon

[57] ABSTRACT

A hydraulic brake control apparatus in which a master cylinder is connected to wheel cylinders via a master cylinder cut valve, and the wheel cylinders are connected to a reservoir tank via a switching valve, includes a check valve provided between the master cylinder and the wheel cylinders in parallel with the master cylinder cut valve, the check valve provided in a bypass passage of the master cylinder cut valve, the check valve allowing a flow of a brake fluid from the master cylinder to the wheel cylinders and inhibiting a flow of the brake fluid from the wheel cylinders to the master cylinder. A valve control unit controls the switching valve when it is detected that a closed-position defect in the master cylinder cut valve has occurred and a pressure of the brake fluid in the master cylinder is decreasing, so that the switching valve is set at an open position to allow a flow of the brake fluid from the wheel cylinders to the reservoir tank through the switching valve and reduce a pressure of the brake fluid in the wheel cylinders.

10 Claims, 4 Drawing Sheets

HYDRAULIC BRAKE CONTROL APPARATUS

BACKGROUND OF THE INVENTION (1) Field of the Invention

The present invention generally relates to a hydraulic brake control apparatus, and more particularly to a hydraulic brake control apparatus which controls a brake fluid pressure in a brake system of an automotive vehicle.

(2) Description of the Related Art

A hydraulic brake control apparatus having two pressure supplying devices connected to wheel cylinders of an automotive brake system is known. For example, Japanese Laid-Open Patent Application No.4-243655 discloses this type of apparatus.

In the conventional apparatus of the above-mentioned publication, a master cylinder supplies a brake fluid pressure responsive to a brake operating force, and a pressure supplying device supplies a brake fluid pressure responsive to a drive signal. The pressure supplying device is controlled such that the brake fluid pressure supplied by the pressure supplying device is set at a brake fluid pressure which is equivalent to the brake operating force multiplied by a predetermined constant.

In the apparatus of the above-mentioned publication, the master cylinder is connected to the wheel cylinders via a switching valve, and the pressure supplying device is connected to the wheel cylinders via the switching valve. When the pressure supplying device normally operates, the flow of the brake fluid from the master cylinder to the wheel cylinders is inhibited by the switching valve, and the brake fluid pressure from the pressure supplying device is supplied to the wheel cylinders.

On the other hand, when a defect in the pressure supplying device has occurred, the flow of the brake fluid from the pressure supplying device to the wheel cylinders is inhibited by the switching valve, and the flow of the brake fluid from the master cylinder to the wheel cylinders is allowed by the switching valve. In this case, the brake fluid pressure responsive to the brake operating force is supplied to the wheel cylinders by the master cylinder.

According to the conventional apparatus of the above-mentioned publication, it is possible to supply a proper brake fluid pressure from the pressure supplying device to the wheel cylinders when the pressure supplying device normally operates, and it is possible to supply a proper brake fluid pressure from the master cylinder to the wheel cylinders when a defect in the pressure supplying device has occurred. Therefore, the conventional apparatus provides a fail-safe function against a defect in the pressure supplying device.

However, if a defect in the switching valve has occurred and the defective valve is fixed at the closed position to close the related brake fluid path, the flow of the brake fluid from the master cylinder to the wheel cylinders is unsuitably inhibited by the defective valve. Hereinafter, this defect will be called the closed-position defect. If the closed-position defect in the switching valve has occurred, it is no longer possible for the conventional apparatus to supply a proper brake fluid pressure from the master cylinder to the wheel cylinders through the switching valve when a defect in the pressure supplying device has occurred.

Therefore, the conventional apparatus of the above-mentioned publication cannot provide the fail-safe function against a defect in the pressure supplying device if the closed-position defect in the switching valve has occurred. In such a case, the conventional apparatus cannot produce a proper brake fluid pressure in the wheel cylinders, and the wheel cylinders cannot produce an adequately great braking force on the vehicle wheels.

SUMMARY OF THE INVENTION

An object of the present invention is to provide an improved hydraulic brake control apparatus in which the above-described problems are eliminated.

Another object of the present invention is to provide a hydraulic brake control apparatus which carries out an appropriate fail-safe function against a defect in the pressure supplying device even when the hydraulic brake control apparatus is in a condition in which a closed-position defect in a switching valve between the master cylinder and the wheel cylinders has occurred.

The above-mentioned objects of the present invention are achieved by a hydraulic brake control apparatus in which a master cylinder is connected to wheel cylinders via a master cylinder cut valve, and the wheel cylinders are connected to a reservoir tank via a switching valve, the apparatus comprising: a check valve which is provided between the master cylinder and the wheel cylinders in parallel with the master cylinder cut valve, the check valve provided in a bypass passage of the master cylinder cut valve, the check valve allowing a flow of a brake fluid from the master cylinder to the wheel cylinders and inhibiting a flow of the brake fluid from the wheel cylinders to the master cylinder; and a valve control unit which controls the switching valve when it is detected that a closed-position defect in the master cylinder cut valve has occurred and a pressure of the brake fluid in the master cylinder is decreasing, so that the switching valve is set at an open position to allow a flow of the brake fluid from the wheel cylinders to the reservoir tank through the switching valve and reduce a pressure of the brake fluid in the wheel cylinders.

In the hydraulic brake control apparatus of the present invention, the master cylinder is connected to the wheel cylinders via the master cylinder cut valve, and the master cylinder is connected to the wheel cylinders via the check valve in the bypass passage of the master cylinder cut valve. In a condition in which the closed-position defect in the master cylinder cut valve has occurred, the check valve allows the flow of the brake fluid from the master cylinder to the wheel cylinders and inhibits the counter flow of the brake fluid from the wheel cylinders to the master cylinder. Even when the pressure of the brake fluid in the master cylinder is decreasing in the condition in which the closed-position defect in the master cylinder cut valve has occurred, the brake fluid in the wheel cylinders cannot flow into the master cylinder through the check valve.

In the hydraulic brake control apparatus of the present invention, the valve control unit controls the switching valve when it is detected that the closed-position defect in the master cylinder cut valve has occurred and the pressure of the brake fluid in the master cylinder is decreasing, so that the switching valve is set at the open position to allow the flow of the brake fluid from the wheel cylinders to the reservoir tank through the switching valve and reduce the pressure of the brake fluid in the wheel cylinders. The hydraulic brake control apparatus of the present invention can appropriately adjust the pressure of the brake fluid in the wheel cylinders to be equal to the pressure of the brake fluid supplied by the master cylinder. Accordingly, it is possible for the hydraulic brake control apparatus to provide the fail-safe function against the defect in the pressure supplying device not only when the master cylinder cut valve normally operates but also when the closed-position defect in the master cylinder cut valve has occurred.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENT

A description will now be given of the preferred embodiment of the present invention with reference to the accompanying drawings.

Figure 1:
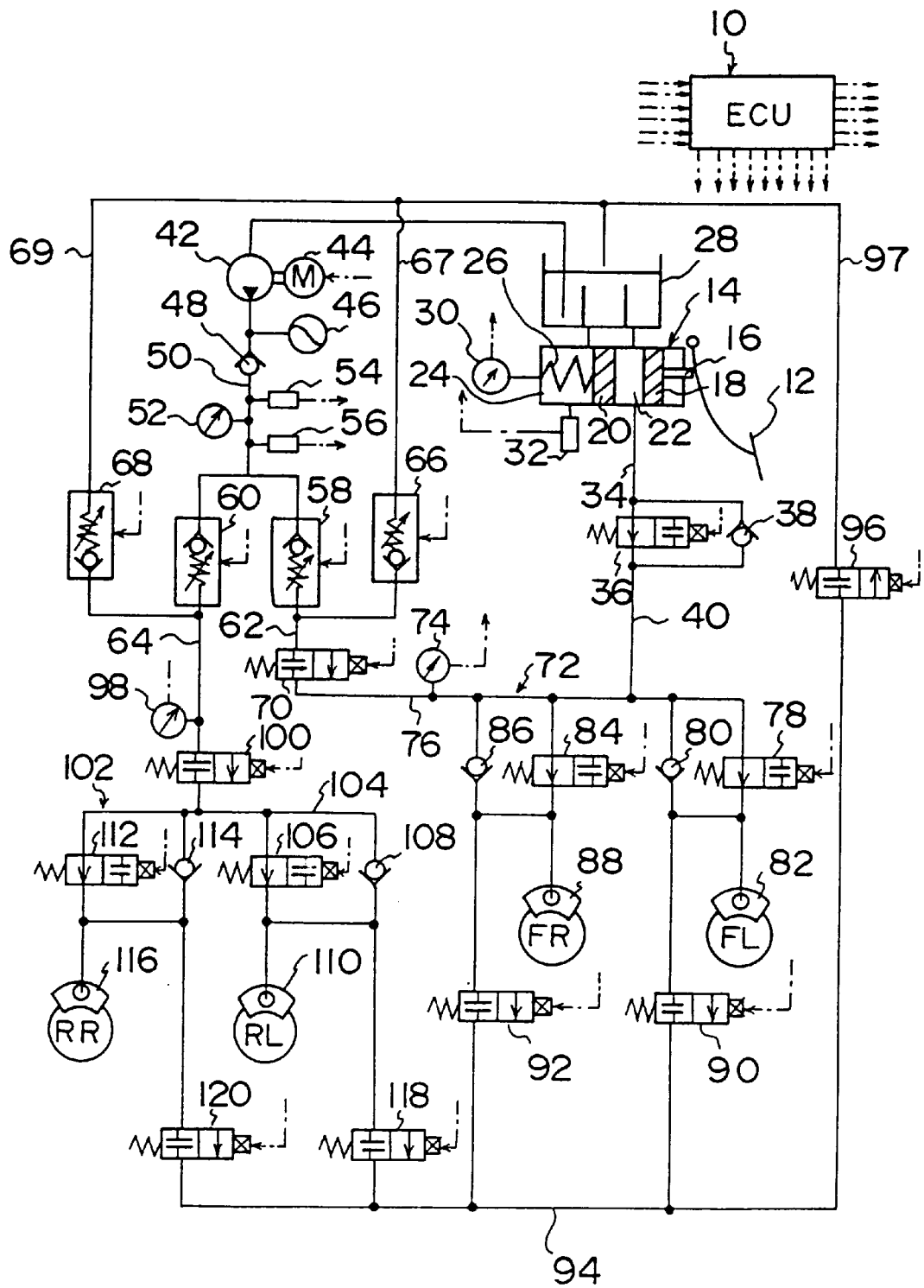
FIG. 1 is a diagram of a brake system to which the present invention is applied.

FIG. 1 shows a brake system to which the present invention is applied.

As shown in FIG. 1, the brake system is used in an automotive vehicle and includes an electronic control unit (ECU) 10. The electronic control unit 10 controls the elements of the brake system in accordance with the operating conditions of the automotive vehicle. Hereinafter, the electronic control unit 10 will be called the ECU 10.

In FIG. 1, input signal paths over which signals from the elements of the brake system are sent to the ECU 10, and output signal paths over which signals from the ECU 10 are sent to the elements of the brake system are omitted for the sake of convenience. Unless otherwise specified, these signal paths are indicated by dotted-line arrows in FIG. 1, and brake fluid paths on which brake fluid is supplied between the elements of the brake system are indicated by solid lines in FIG. 1.

The brake system comprises a brake pedal 12. The brake pedal 12 is connected to an input shaft 16 of a master cylinder 14.

The master cylinder 14 includes a first piston 18 and a second piston 20 which are provided in the master cylinder 14. The first piston 18 is connected to the input shaft 16 via a front surface of the master cylinder 14. In the master cylinder 14, a first pressure chamber 22 between the first piston 18 and the second piston 20 is provided, and a second pressure chamber 24 between the second piston 20 and a rear surface of the master cylinder 14 is provided. In the second pressure chamber 24, a spring 26 is provided, and the spring 26 exerts an actuating force on the second piston 20 to push the second piston 20 toward the brake pedal 12.

When the brake pedal 12 is set at an original position (or the brake pedal 12 is not depressed by the vehicle operator), the first piston 18 and the second piston 20 in the master cylinder 14 are set at starting positions. When the brake pedal 12 is set at an operated position (or the brake pedal 12 is depressed by the vehicle operator) and then released, the first piston 18 and the second piston 20 are returned to the starting positions.

A reservoir tank 28 is provided above the master cylinder 14. The reservoir tank 28 contains a brake fluid stored therein. The reservoir tank 28 is connected to both the first pressure chamber 22 and the second pressure chamber 24 only when the first piston 18 and the second piston 20 are set at the starting positions in the master cylinder 14. Otherwise the reservoir tank 28 is disconnected from the master cylinder 14. Therefore, the brake fluid in the reservoir tank 28 is replenished to both the first pressure chamber 22 and the second pressure chamber 24 of the master cylinder 14 each time the brake pedal 12 is released by the vehicle operator or set at the original position.

A master cylinder pressure sensor 30 (which will be called the Pmc sensor 30) and a pressure switch 32 are provided in the second pressure chamber 24 of the master cylinder 14.

The Pmc sensor 30 outputs a signal indicative of a brake fluid pressure in the second pressure chamber 24 of the master cylinder 14. The signal output from the Pmc sensor 30 is supplied to the ECU 10. The ECU 10 detects a master cylinder pressure Pmc (which will be called the pressure Pmc) based on the signal from the Pmc sensor 30.

The pressure switch 32 outputs an ON signal when the brake fluid pressure in the master cylinder 14 is higher than a reference level. The ON signal from the pressure switch 32 is supplied to the ECU 10. The ECU 10 detects whether the brake pedal 12 is set at the operated position (or whether it is depressed by the vehicle operator), based on whether the ON signal from the pressure switch 32 is supplied to the ECU 10.

A pressure passage 34 is connected at one end to the first pressure chamber 22 of the master cylinder 14. The pressure passage 34 is connected at the other end to a pressure passage 40 via a master cylinder cut valve 36 (which will be called the MCV 36). In addition, the pressure passage 34 is connected to the pressure passage 40 via a bypass passage in which a check valve 38 is provided.

The MCV 36 is an electromagnetic valve which is set at one of an open position and a closed position. When a drive signal from the ECU 10 is not supplied to the MCV 36, the MCV 36 is always at the open position so that the brake fluid from the master cylinder 14 is allowed to flow into the pressure passage 40 via the MCV 36. When the drive signal from the ECU 10 is supplied to the MCV 36, the MCV 36 is set at the closed position, so that a flow of the brake fluid from the master cylinder 14 into the pressure passage 40 via the MCV 36 is inhibited.

The check valve 38 is a type of valve which allows a flow of fluid in one direction only. The check valve 38 allows a flow of the brake fluid from the pressure passage 34 to the pressure passage 40 via the bypass passage of the MCV 36. The check valve 38 inhibits a counter flow of the brake fluid from the pressure passage 40 to the pressure passage 34 via the bypass passage of the MCV 36.

The brake system comprises a pump 42. The pump 42 is provided with an actuating motor 44. The actuating motor 44 actuates the pump 42 so that the pump 42 supplies a high-pressure brake fluid. The operation of the motor 44 is controlled by the ECU 10. An inlet port of the pump 42 is connected to the reservoir tank 28. An outlet port of the pump 42 is connected to a high-pressure passage 50 via a check valve 48. An accumulator 46 is provided between the outlet port of the pump 42 and the check valve 48, and the accumulator 46 and the pump 42 connected to each other.

An accumulator pressure sensor 52 (which will be called the Pacc sensor 52) is connected to the high-pressure passage 50. The Pacc sensor 52 outputs a signal indicative of a brake fluid pressure in the high-pressure passage 50. The signal output from the Pacc sensor 52 is supplied to the ECU 10. The ECU 10 detects the brake fluid pressure in the high-pressure passage 50 based on the signal from the Pacc sensor 52. An accumulator pressure Pacc (which will be called the pressure Pacc) in the accumulator 46 is equivalent to the brake fluid pressure in the high-pressure passage 50. That is, the ECU 10 detects the present level of the pressure Pacc in the accumulator 46 based on the signal from the Pacc sensor 52.

An upper-limit sensor 54 and a lower-limit sensor 56 are connected to the high-pressure passage 50 at positions adjacent to the Pacc sensor 52. The upper-limit sensor 54 outputs an ON signal when the brake fluid pressure (or the pressure Pacc) in the high-pressure passage 50 is higher than an upper limit of a predetermined operating pressure range of the pressures Pacc for the accumulator 46. The lower-limit sensor 56 outputs an ON signal when the brake fluid pressure in the high-pressure passage 50 is lower than a lower limit of the predetermined operating pressure range of the pressures Pacc for the accumulator 46. Both the signal from the upper-limit sensor 54 and the signal from the lower-limit sensor 56 are supplied to the ECU 10.

When the lower-limit sensor 56 outputs an ON signal to the ECU 10, the ECU 10 supplies a drive signal to the motor 44 so that the pump 42 is actuated by the motor 44. The ECU 10 continues to supply the drive signal to the motor 44 until the upper-limit sensor 54 outputs an ON signal to the ECU 10. According to this operation, the pressure Pacc in the accumulator 46 is always maintained to be in the predetermined operating pressure range.

A pressure-up linear valve 58 and a pressure-up linear valve 60 are connected to the high-pressure passage 50 at the end of the high-pressure passage 50. The pressure-up linear valve 58 is connected at the other end to a front pressure passage 62, and the pressure-up linear valve 60 is connected at the other end to a rear pressure passage 64.

The front pressure passage 62 is connected to the reservoir tank 28 via a first return passage 67 in which a pressure-down linear valve 66 is provided. The rear pressure passage 64 is connected to the reservoir tank 28 via a second return passage 69 in which a pressure-down linear valve 68 is provided.

When drive signals are not supplied by the ECU 10, the pressure-up linear valves 58 and 60 and the pressure-down linear valves 66 and 68 are set at the closed positions. When the drive signals are supplied by the ECU 10, the pressure-up linear valves 58 and 60 and the pressure-down linear valves 66 and 68 are set at the open positions. When one of the four linear valves 58, 60, 66 and 68 is set at the open position, an effective valve-opening area in a corresponding one of the passages 62, 64, 67 and 69 is formed by the related linear valve. The effective valve-opening area formed by the related linear valve varies in proportion to the level of the drive signal supplied by the ECU 10.

Therefore, in the above-described hydraulic brake control apparatus, by changing the level of the drive signal supplied to the pressure-up linear valve 58, a pressure of the brake fluid fed from the high-pressure passage 50 into the front pressure passage 62 can be controlled such that the brake fluid pressure is linearly changed. By changing the level of the drive signal supplied to the pressure-down linear valve 66, a pressure of the brake fluid fed from the front pressure passage 62 into the reservoir tank 28 can be controlled such that the brake fluid pressure is linearly changed. By chang-ing the level of the drive signal supplied to the pressure-up linear valve 60, a pressure of the brake fluid fed from the high-pressure passage 50 into the rear pressure passage 64 can be controlled such that the brake fluid pressure is linearly changed. By changing the level of the drive signal supplied to the pressure-down linear valve 68, a pressure of the brake fluid fed from the rear pressure passage 64 into the reservoir tank 28 can be controlled such that the brake fluid pressure is linearly changed.

A front cut valve 70 (which will be called the FCV 70) is connected to the front pressure passage 62 at the end of the front pressure passage 62. The FCV 70 is connected at the other end to a front hydraulic circuit 72.

The FCV 70 is an electromagnetic valve which is set at one of an open position and a closed position. When a drive signal from the ECU 10 is not supplied to the FCV 70, the FCV 70 is always at the closed position so that a flow of the brake fluid from the front pressure passage 62 into the front hydraulic circuit 72 via the FCV 70 is inhibited. When the drive signal from the ECU 10 is supplied to the FCV 70, the FCV 70 is set at the open position, so that the brake fluid from the front pressure passage 62 is allowed to flow into the front hydraulic circuit 72 via the FCV 70.

In addition, the pressure passage 40 is connected to the front hydraulic circuit 72 via a connection passage 76. When the MCV 36 is set at the open position, the master cylinder 14 and the front hydraulic circuit 72 are connected to each other via the pressure passage 40. In this condition, the brake fluid whose pressure is equal to the pressure Pmc is supplied from the master cylinder 14 to the front hydraulic circuit 72.

When the MCV 36 is set at the closed position, the master cylinder 14 and the front hydraulic circuit 72 are connected to each other via the bypass passage in which the check valve 38 is provided. In this condition, if the pressure Pmc is higher than the brake fluid pressure Pf in the front hydraulic circuit 72, the brake fluid pressure Pf in the front hydraulic circuit 72 is increased to the level of the pressure Pmc. The brake fluid pressure Pf will be equal to the master cylinder pressure Pmc. If the pressure Pmc is lower than the brake fluid pressure Pf in the front hydraulic circuit 72, the brake fluid pressure Pf in the front hydraulic circuit 72 is retained at the same level. The brake fluid pressure Pf remains at the level higher than the level of the master cylinder pressure Pmc.

A front wheel cylinder pressure sensor 74 (which will be called the Pf sensor 74) is connected to the connection passage 76 which interconnects the FCV 70 and the front hydraulic circuit 72. The Pf sensor 74 communicates with the pressure passage 40 via the connection passage 76. The Pf sensor 74 outputs a signal indicative of a brake fluid pressure in the connection passage 76. The signal output from the Pf sensor 74 is supplied to the ECU 10. The ECU 10 detects the present level of the brake fluid pressure in the connection passage 76 based on the signal from the Pf sensor 74.

The front hydraulic circuit 72 includes a pressure hold valve 78 and a check valve 80 which are provided in parallel. The pressure hold valve 78 and the check valve 80 are connected to a wheel cylinder 82 provided for a front left ("FL") wheel of the vehicle. The connection passage 76 is connected to the wheel cylinder 82 via the pressure hold valve 78 and the check valve 80.

The check valve 80 allows the flow of the brake fluid from the wheel cylinder 82 to the connection passage 76. The check valve 80 inhibits the flow of the brake fluid from the connection passage 76 to the wheel cylinder 82. The pressure hold valve 78 is an electromagnetic valve which is set at one of an open position and a closed position. When a drive signal from the ECU 10 is not supplied to the pressure hold valve 78, the pressure hold valve 78 is always at the open position so that the brake fluid from the connection passage 76 is allowed to flow into the wheel cylinder 82 via the pressure hold valve 78. When the drive signal from the ECU 10 is supplied to the pressure hold valve 78, the pressure hold valve 78 is set at the closed position, so that the flow of the brake fluid from the connection passage 76 to the wheel cylinder 82 via the pressure hold valve 78 is inhibited.

The front hydraulic circuit 72 includes a pressure hold valve 84 and a check valve 86 which are provided in parallel. The pressure hold valve 84 and the check valve 86 are connected to a wheel cylinder 88 provided for a front right ("FR") wheel of the vehicle. The connection passage 76 is connected to the wheel cylinder 88 via the pressure hold valve 84 and the check valve 86.

The check valve 86 allows the flow of the brake fluid from the wheel cylinder 88 to the connection passage 76. The check valve 86 inhibits the flow of the brake fluid from the connection passage 76 to the wheel cylinder 88. The pressure hold valve 84 is an electromagnetic valve which is set at one of an open position and a closed position. When a drive signal from the ECU 10 is not supplied to the pressure hold valve 84, the pressure hold valve 84 is always at the open position so that the brake fluid from the connection passage 76 is allowed to flow into the wheel cylinder 88 via the pressure hold valve 84. When the drive signal from the ECU 10 is supplied to the pressure hold valve 84, the pressure hold valve 84 is set at the closed position, so that the flow of the brake fluid from the connection passage 76 to the wheel cylinder 88 via the pressure hold valve 84 is inhibited.

The wheel cylinder 82 is connected to a low-pressure passage 94 via a pressure-down valve 90, and the wheel cylinder 88 is connected to the low-pressure passage 94 via a pressure-down valve 92. Each of the pressure-down valves 90 and 92 is an electromagnetic valve which is set at one of an open position and a closed position. When signals from the ECU 10 are not supplied, the pressure-down valves 90 and 92 are always at the closed positions, so that the flow of the brake fluid from the wheel cylinders 82 and 88 into the low-pressure passage 94 via the pressure-down valves 90 and 92 is inhibited. When signals from the ECU 10 are supplied, the pressure-down valves 90 and 92 are set at the open positions, so that the flow of the brake fluid from the wheel cylinders 82 and 88 into the low-pressure passage 94 via the pressure-down valves 90 and 92 is allowed.

A reservoir tank cut valve 96 (which will be called the RVCV 96) is provided in the low-pressure passage 94 between the wheel cylinders 90, 92, 110 and 116 and the reservoir tank 28. The RVCV 96 is connected to the reservoir tank 28 via a return passage 97. The RVCV 96 is an electromagnetic valve which is set at one of an open position and a closed position. When a drive signal from the ECU 10 is not supplied, the RVCV 96 is always at the closed position so that the flow of the brake fluid from the low-pressure passage 94 into the reservoir tank 28 via the RVCV 96 is inhibited. When the drive signal from the ECU 10 is supplied, the RVCV 96 is set at the open position, so that the brake fluid from the low-pressure passage 94 is allowed to flow into the reservoir tank 28 via the RVCV 96.

A rear wheel cylinder pressure sensor 98 (which will be called the Pr sensor 98) is connected to the rear pressure passage 64. The Pr sensor 98 outputs a signal indicative of a brake fluid pressure in the rear pressure passage 64. The signal output from the Pr sensor 98 is supplied to the ECU 10. The ECU 10 detects the present level of the brake fluid pressure in the rear pressure passage 64 based on the signal from the Pr sensor 98.

A rear cut valve 100 (which will be called the RCV 100) is connected to the rear pressure passage 64 at the end of the rear pressure passage 64. The RCV 100 is connected at the other end to a rear hydraulic circuit 102 via a connection passage 104.

The RCV 100 is an electromagnetic valve which is set at one of an open position and a closed position. When a drive signal from the ECU 10 is not supplied to the RCV 100, the RCV 100 is always at the closed position so that the flow of the brake fluid from the rear pressure passage 64 into the rear hydraulic circuit 102 via the RCV 100 is inhibited. When the drive signal from the ECU 10 is supplied to the RCV 100, the RCV 100 is set at the open position, so that the brake fluid from the rear pressure passage 64 is allowed to flow into the rear hydraulic circuit 102 via the RCV 100.

The rear hydraulic circuit 102 includes a pressure hold valve 106 and a check valve 108 which are provided in parallel. The pressure hold valve 106 and the check valve 108 are connected to a wheel cylinder 110 provided for a rear left ("RL") wheel of the vehicle. The connection passage 104 is connected to the wheel cylinder 110 via the pressure hold valve 106 and the check valve 108.

The check valve 108 allows the flow of the brake fluid from the wheel cylinder 110 to the connection passage 104. The check valve 108 inhibits the flow of the brake fluid from the connection passage 104 to the wheel cylinder 110. The pressure hold valve 106 is an electromagnetic valve which is set at one of an open position and a closed position. When a drive signal from the ECU 10 is not supplied to the pressure hold valve 106, the pressure hold valve 106 is always at the open position so that the brake fluid from the connection passage 104 is allowed to flow into the wheel cylinder 110 via the pressure hold valve 106. When the drive signal from the ECU 10 is supplied to the pressure hold valve 106, the pressure hold valve 106 is set at the closed position, so that the flow of the brake fluid from the connection passage 104 to the wheel cylinder 110 via the pressure hold valve 106 is inhibited.

The rear hydraulic circuit 102 includes a pressure hold valve 112 and a check valve 114 which are provided in parallel. The pressure hold valve 112 and the check valve 114 are connected to a wheel cylinder 116 provided for a rear right ("RR") wheel of the vehicle. The connection passage 104 is connected to the wheel cylinder 116 via the pressure hold valve 112 and the check valve 114.

The check valve 114 allows the flow of the brake fluid from the wheel cylinder 116 to the connection passage 104. The check valve 114 inhibits the flow of the brake fluid from the connection passage 104 to the wheel cylinder 116. The pressure hold valve 112 is an electromagnetic valve which is set at one of an open position and a closed position. When a drive signal from the ECU 10 is not supplied to the pressure hold valve 112, the pressure hold valve 112 is always at the open position so that the brake fluid from the connection passage 104 is allowed to flow into the wheel cylinder 116 via the pressure hold valve 112. When the drive signal from the ECU 10 is supplied to the pressure hold valve 112, the pressure hold valve 112 is set at the closed position, so that the flow of the brake fluid from the connection passage 104 to the wheel cylinder 116 via the pressure hold valve 112 is inhibited.

The wheel cylinder 110 is connected to the low-pressure passage 94 via a pressure-down valve 118, and the wheel cylinder 116 is connected to the low-pressure passage 94 via a pressure-down valve 120. Each of the pressure-down valves 118 and 120 is an electromagnetic valve which is set at one of an open position and a closed position. When signals from the ECU 10 are not supplied, the pressure-down valves 118 and 120 are always at the closed positions, so that the flow of the brake fluid from the wheel cylinders 110 and 116 into the low-pressure passage 94 via the pressure-down valves 118 and 120 is inhibited. When signals from the ECU 10 are supplied, the pressure-down valves 118 and 120 are set at the open positions, so that the flow of the brake fluid from the wheel cylinders 110 and 116 into the low-pressure passage 94 via the pressure-down valves 118 and 120 is allowed.

In the brake system of FIG. 1, when a brake operating force Fp by the vehicle operator is placed onto the brake pedal 12, the brake fluid pressure in the first pressure chamber 22 and the brake fluid pressure in the second pressure chamber 24 are increased in response to the brake operating force Fp on the brake pedal 12.

When the brake fluid pressure in the second pressure chamber 24 of the master cylinder 14 is higher than the reference level, the pressure switch 32 outputs an ON signal to the ECU 10. The ECU 10 detects that the brake pedal 12 is set at the operated position or depressed by the vehicle operator, based on the ON signal from the pressure switch 32.

When the depression of the brake pedal 12 by the vehicle operator is detected, the ECU 10 supplies signals to the MCV 36, the FCV 70 and the RCV 10, so that the MCV 36 is set at the closed position, and the FCV 70 and the RCV 100 are set at the open positions.

In this case, the flow of the brake fluid from the master cylinder 14 into the pressure passage 40 via the MCV 36 is inhibited. The brake fluid from the front pressure passage 62 is allowed to flow into the front hydraulic circuit 72 via the FCV 70. The pressure of the brake fluid supplied from the FCV 70 is adjusted to a pressure Pf by the pressure-up linear valve 58 and the pressure-down linear valve 66, and these linear valves 58 and 66 will be called the front linear valves 58 and 66. Further, the brake fluid from the rear pressure passage 64 is allowed to flow into the rear hydraulic circuit 102 via the RCV 100. The pressure of the brake fluid supplied from the RCV 100 is adjusted to a brake fluid pressure Pr by the pressure-up linear valve 60 and the pressure-down linear valve 68, and these linear valves 60 and 68 will be called the rear linear valves 60 and 68.

Under such conditions, the Pmc sensor 30 outputs a signal indicative of the pressure Pmc in the master cylinder 14 in response to the brake operating force Fp. The Pf sensor 74 outputs a signal indicative of the pressure Pf in the connection passage 76, the pressure Pf being adjusted by the front linear valves 58 and 66. The Pr sensor 98 outputs a signal indicative of the pressure Pr in the rear pressure passage 64 or the connection passage 104, the pressure Pr being adjusted by the rear linear valves 60 and 68.

Based on the signals from the Pmc sensor 30 and the Pf sensor 74, the ECU 10 controls the front linear valves 58 and 66 such that a brake fluid pressure Pf is supplied by the front linear valves 58 and 66 and a ratio of the pressure Pf to the pressure Pmc is set at a predetermined constant. Based on the signals from the Pmc sensor 30 and the Pr sensor 98, the ECU 10 controls the rear linear valves 60 and 68 such that a brake fluid pressure Pr is supplied by the rear linear valves 60 and 68 and a ratio of the pressure Pr to the pressure Pmc is set at a predetermined constant.

When a hydraulic brake control process is not performed by the hydraulic brake control apparatus, the pressure hold valves 78 and 84 are set at the open positions and the pressure-down valves 90 and 92 are set at the closed positions. Under such conditions, the brake fluid pressure Pf in the connection passage 76 of the front hydraulic circuit 72 is supplied to the front wheel cylinders 82 and 88. The brake fluid pressure Pf in the front wheel cylinders 82 and 88 is adjusted such that a ratio of the pressure Pf to the master cylinder pressure Pmc (which varies in response to the brake operating force Fp) is set at a predetermined constant.

Similarly, when the hydraulic brake control process is not performed by the hydraulic brake control apparatus, the pressure hold valves 106 and 112 are set at the open positions and the pressure-down valves 118 and 120 are set at the closed positions. Under such conditions, the brake fluid pressure Pr in the connection passage 104 of the rear hydraulic circuit 102 is supplied to the rear wheel cylinders 110 and 116. The brake fluid pressure Pr in the rear wheel cylinders 110 and 116 is adjusted such that a ratio of the pressure Pr to the master cylinder pressure Pmc (which varies in response to the brake operating force Fp) is set at a predetermined constant.

Accordingly, in the brake system of FIG. 1, it is possible to adjust the pressure Pf in the front wheel cylinders 82 and 88 and the pressure Pr in the rear wheel cylinders 110 and 116 such that the pressure Pf and the pressure Pr are set at predetermined values in response to the brake operating force Fp. A control procedure in which the above-described function is achieved by the brake system when the hydraulic brake control process is not performed will be called a normal control mode.

In the hydraulic brake control apparatus of the above-described embodiment, the front linear valves 58 and 66 can be controlled such that the ratio of the pressure Pf to the pressure Pmc is set at a predetermined constant which is varied independently of the pressure Pmc in the master cylinder 14, and the rear linear valves 60 and 68 can be controlled such that the ratio of the pressure Pr to the pressure Pmc is set at a predetermined constant which is varied independently of the pressure Pmc in the master cylinder 14. The pressure Pf from the front linear valves 58 and 66 is supplied to the connection passage 76 of the front hydraulic circuit 72 via the FCV 70, and the pressure Pr from the rear linear valves 60 and 68 is supplied to the connection passage 114 of the rear hydraulic circuit 102 via the RCV 100.

Therefore, in the hydraulic brake control apparatus of the above-described embodiment, the pressure Pf in the front wheel cylinders 82 and 88 can be suitably increased by controlling the front linear valves 58 and 66, and the pressure Pr in the rear wheel cylinders 110 and 116 can be suitably increased by controlling the rear linear valves 60 and 68. A control procedure in which the above-described function is achieved by the hydraulic brake control apparatus of the present embodiment will be called a pressure-increase control mode.

Further, in the hydraulic brake control apparatus of the above-described embodiment, when the pressure hold valve 78 is set at the closed position and the pressure-down valve 90 is set at the closed position, it is possible to continuously hold the pressure Pf in the wheel cylinder 82 at the same level. When the pressure hold valve 84 is set at the closed position and the pressure-down valve 92 is set at the closed position, it is possible to hold the pressure Pf in the wheel cylinder 88 at the same level. When the pressure hold valve 106 is set at the closed position and the pressure-down valve 118 is set at the closed position, it is possible to continuously hold the pressure Pr in the wheel cylinder 110 at the same level. When the pressure hold valve 112 is set at the closed position and the pressure-down valve 120 is set at the closed position, it is possible to continuously hold the pressure Pr in the wheel cylinder 116 at the same level.

Therefore, in the hydraulic brake control apparatus of the above-described embodiment, the pressure Pf in the front wheel cylinders 82 and 88 can be maintained at a desired level by controlling the pressure hold valves 78 and 84 and the pressure-down valves 90 and 92, and the pressure Pr in the rear wheel cylinders 110 and 116 can be maintained at a desired level by controlling the pressure hold valves 106 and 112 and the pressure-down valves 118 and 120. A control procedure in which the above-described function is achieved by the hydraulic brake control apparatus of the present embodiment will be called a pressure hold control mode.

Further, in the hydraulic brake control apparatus of the above-described embodiment, when the pressure hold valve 78 is set at the closed position and the pressure-down valve 90 and the RVCV 96 are set at the open positions, it is possible to suitably reduce the pressure Pf in the wheel cylinder 82. When the pressure hold valve 84 is set at the closed position and the pressure-down valve 92 and the RVCV 96 are set at the open positions, it is possible to suitably reduce the pressure Pf in the wheel cylinder 88. When the pressure hold valve 106 is set at the closed position and the pressure-down valve 118 and the RVCV 96 are set at the open positions, it is possible to suitably reduce the pressure Pr in the wheel cylinder 110. When the pressure hold valve 112 is set at the closed position and the pressure-down valve 120 and the RVCV 96 are set at the closed positions, it is possible to suitably reduce the pressure Pr in the wheel cylinder 116.

Therefore, in the hydraulic brake control apparatus of the present embodiment, the pressure Pf in the front wheel cylinders 82 and 88 can be suitably reduced by controlling the pressure hold valves 78 and 84, the RVCV 96 and the pressure-down valves 90 and 92, and the pressure Pr in the rear wheel cylinders 110 and 116 can be suitably reduced by controlling the pressure hold valves 106 and 112, the RVCV 96 and the pressure-down valves 118 and 120. A control procedure in which the above-described function is achieved by the hydraulic brake control apparatus of the present embodiment will be called a pressure-decrease control mode.

The ECU 10 suitably carries out one of the normal control mode, the pressure-increase control mode, the pressure hold control mode and the pressure-decrease control mode of the brake system based on the operating conditions of the vehicle and the respective slip ratios of the FL, FR, RL and RR wheels of the vehicle. The normal control mode is carried out in order to achieve a hydraulic brake control function responsive to the brake operating force of the vehicle operator. The pressure-increase control mode, the pressure hold control mode and the pressure-decrease control mode in combination are carried out in order to achieve a hydraulic brake control function appropriate to ensure a vehicle running stability.

In the hydraulic brake control apparatus of the above-described embodiment, if a defect in the front linear valves 58 and 66 or the rear linear valves 60 and 68 has occurred, a pressure of the brake fluid fed from the linear valves into the front hydraulic circuit 72 or the rear hydraulic circuit 102 may be excessively low. It is impossible to increase the wheel cylinder pressure Pwc in the wheel cylinders 82 and 88 or the wheel cylinders 110 and 116 to an adequately high pressure by supplying the brake fluid pressure from the linear valves 58, 66, 60 and 68 to the wheel cylinders.

Under a condition in which a defect in the front linear valves 58 and 66 has occurred, if the MCV 36 is set at the open position and the FCV 70 is set at the closed position, a flow of the brake fluid fed from the master cylinder 14 into the wheel cylinders 82 and 88 through the MCV 36 is allowed.

Under a condition in which a defect in the front linear valves 58 and 66 and a defect in the rear linear valves 60 and 68 have occurred, if the MCV 36 is set at the open position and the FCV 70 and the RCV 100 are set at the closed positions and the pressure-down valves 90, 92, 118 and 120 are set at the open positions, a flow of the brake fluid fed from the master cylinder 14 into the wheel cylinders 82, 88, 110 and 116 through the MCV 36 and the pressure-down valves 90, 92, 118 and 120 is allowed.

When the flow of the brake fluid fed from the master cylinder 14 into the front wheel cylinders 82 and 88 is allowed, the wheel cylinder pressure Pwc in the front wheel cylinders 82 and 88 for the FL and FR wheels of the vehicle can be adjusted to be equal to the master cylinder pressure Pmc in the master cylinder 14.

When the flow of the brake fluid fed from the master cylinder 14 into the wheel cylinders 82, 88, 110 and 116 is allowed, both the wheel cylinder pressure Pwc in the front wheel cylinders 82 and 88 for the FL and FR wheels and the wheel cylinder pressure Pwc in the rear wheel cylinders 110 and 116 for the RL and RR wheels can be adjusted to be equal to the master cylinder pressure Pmc in the master cylinder 14.

In the above-described hydraulic brake control apparatus, the wheel cylinder pressure Pwc in the front wheel cylinders 82 and 88 is adjusted to be equal to the master cylinder pressure Pmc in the master cylinder 14 by setting the MCV 36 at the open position and setting the FCV 70 at the closed position under the condition in which the defect in the front linear valves 58 and 66 has occurred. Under the condition in which the defect in the front linear valves 58 and 66 and the defect in the rear linear valves 60 and 68 have occurred, the wheel cylinder pressure Pwc in the front wheel cylinders 82 and 88 and the wheel cylinder pressure Pwc in the rear wheel cylinders 110 and 116 are adjusted to be equal to the master cylinder pressure Pmc in the master cylinder 14 by setting the MCV 36 at the open position, setting the FCV 70 and the RCV 100 at the closed positions and setting the pressure-down valves 90, 92, 118 and 120 at the open positions.

In the above-described brake system, there may be a case in which a defect in the MCV 36 between the master cylinder 14 and the wheel cylinders has occurred and the MCV 36 is fixed at the closed position to close the pressure passage 40. This defect will be called the closed-position defect. If the closed-position defect in the MCV 36 has occurred, the flow of the brake fluid from the master cylinder 14 to the wheel cylinders 82 and 88 through the defective MCV 36 is always inhibited even when a drive signal from the ECU 10 is supplied to the MCV 36. In this case, the wheel cylinder pressure Pwc in the front wheel cylinders 82 and 88 and the wheel cylinder pressure Pwc in the rear wheel cylinders 110 and 116 cannot be adjusted to be equal to the master cylinder pressure Pmc in the master cylinder 14.

If the wheel cylinder pressure Pwc is not adjusted to a brake fluid pressure responsive to the brake operating force Fp after the occurrence of a defect in the front linear valves 58 and 66 or the occurrence of defects in the linear valves 58, 66, 60 and 68 is detected, it is impossible to carry out a proper fail-safe function against the defect in the front linear valves 58 and 66 or the defects in the linear valves 58, 66, 60 and 68. An important function of the hydraulic brake control apparatus of the above-described embodiment is that the hydraulic brake control apparatus can carry out a proper fail-safe function against the defect in the front linear valves 58 and 66 or the defects in the linear valves 58, 66, 60 and 68 under the condition in which the closed-position defect in the MCV 36 has occurred.

The above-mentioned function of the hydraulic brake control apparatus of the present embodiment is achieved by carrying out a hydraulic brake control process by means of the ECU 10 of the brake system of FIG. 1, which will be described in the following.

Figure 2:
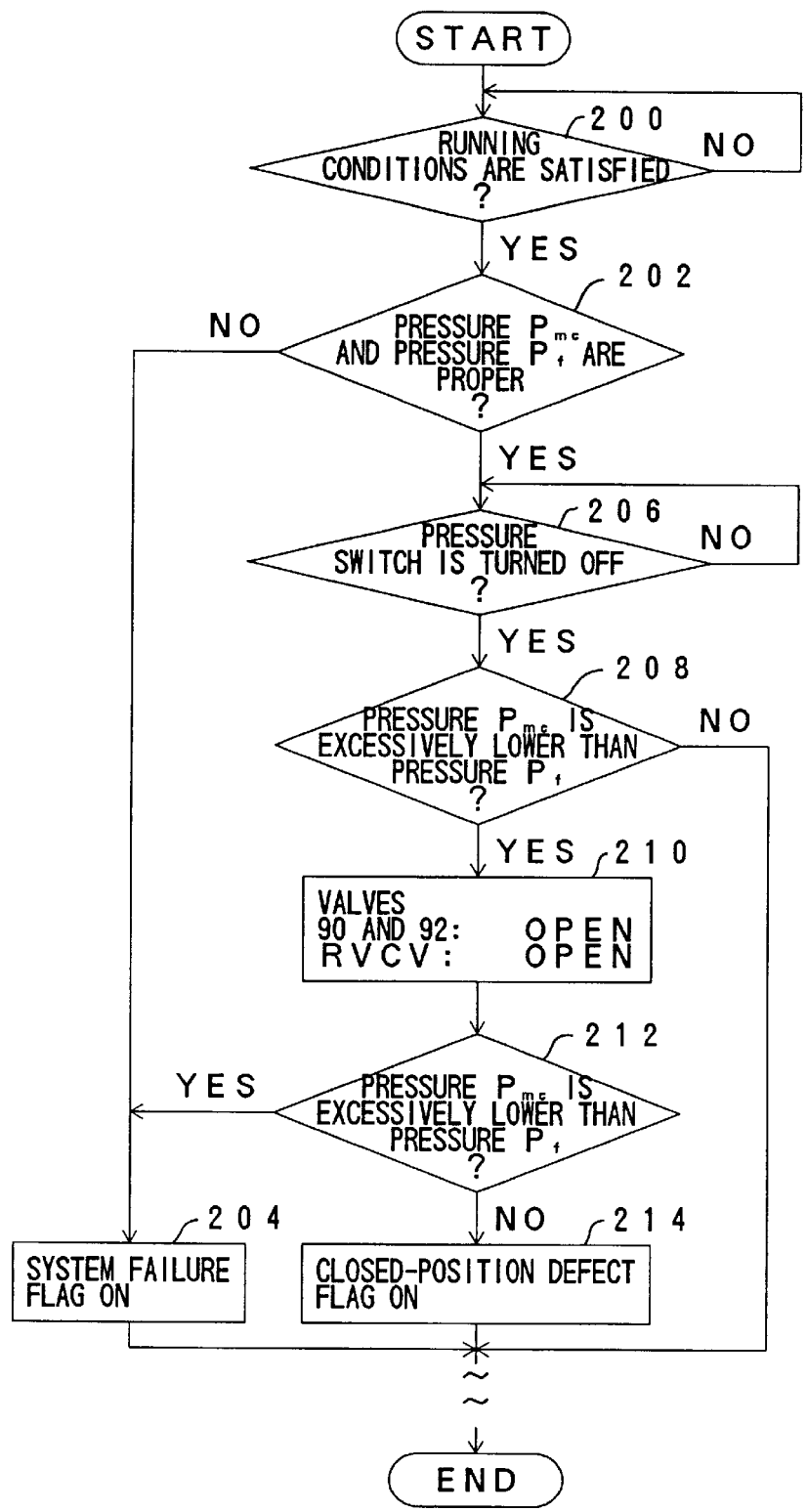
FIG. 2 is a flowchart for explaining an initial routine performed by a hydraulic brake control apparatus embodying the present invention.

FIG. 2 shows an initial routine of the hydraulic brake control process executed by the ECU 10 of the brake system of FIG. 1. The initial routine of FIG. 2 is executed in order to detect whether the closed-position defect in the MCV 36 of the brake system has occurred.

The execution of the initial routine of FIG. 2 is started each time an ignition switch (not shown) of the vehicle is turned ON by the vehicle operator.

As shown in FIG. 2, the ECU 10 at step 200 detects whether running conditions for the detection as to the occurrence of the closed-position defect in the MCV 36 are satisfied. In the above-described brake system, when the ignition switch is in the ON state and it is detected based on the ON signal output from the pressure switch 32 that the brake pedal 12 is depressed by the vehicle operator, it is determined that the running conditions are satisfied. When the result at the step 200 is affirmative, step 202 is executed by the ECU 10. Otherwise the step 200 is repeated until the result at the step 200 is affirmative.

Step 202 detects whether both the pressure Pmc detected by the Pmc sensor 30 and the pressure Pf detected by the Pf sensor 74 are at proper levels.

In the above-described brake system, if the closed-position defect in the MCV 36 does not occur immediately after the ignition switch is turned ON, the MCV 36 is set at the open position. When the MCV 36 is set at the open position and the brake pedal 12 is depressed, the brake fluid pressure Pmc produced by the master cylinder 14 in response to the brake operating force Fp is supplied to the front hydraulic circuit 72 through the MCV 36. If the Pmc sensor 30, the Pf sensor 74 and the front hydraulic circuit 72 normally operate, both the pressure Pmc detected by the Pmc sensor 30 and the pressure Pf detected by the Pf sensor 74 are at proper levels.

If the closed-position defect in the MCV 36 has occurred immediately after the ignition switch is turned ON, the MCV 36 is fixed at the closed position to close the pressure passage 40 even when the drive signal from the ECU 10 is supplied to the MCV 36. When the MCV 36 is fixed at the closed position and the brake pedal 12 is depressed, the brake fluid pressure Pmc produced by the master cylinder 14 in response to the brake operating force Fp is supplied to the front hydraulic circuit 72 through the check valve 38. If the Pmc sensor 30, the Pf sensor 74 and the front hydraulic circuit 72 normally operate under the condition in which the closed-position defect in the MCV 36 has occurred, the pressure Pmc detected by the Pmc sensor 30 and the pressure Pf detected by the Pf sensor 74 are at proper levels.

Therefore, if the Pmc sensor 30, the Pf sensor 74 and the front hydraulic circuit 72 normally operate, regardless of whether the closed-position defect in the MCV 36 has occurred, the pressure Pmc detected by the Pmc sensor 30 and the pressure Pf detected by the Pf sensor 74 are at proper levels.

Accordingly, when the result at the step 202 is affirmative, it is determined that the Pmc sensor 30, the Pf sensor 74 and the front hydraulic circuit 72 normally operate. At this time, step 206 is executed by the ECU 10. On the other hand, when the result at the step 202 is negative, it is determined that another defect, different from the closed-position defect in the MCV 36, in the brake system has occurred. At this time, step 204 is executed by the ECU 10.

Step 204 sets a system failure flag in an ON state, which indicates that another defect in the brake system has occurred. After the step 204 is performed, the initial routine of FIG. 2 ends.

Step 206 detects whether the pressure switch 32 is turned OFF. When the vehicle operator releases the brake pedal 12, the pressure switch 32 stops outputting the ON signal to the ECU 10. Otherwise the pressure switch 32 continues to output the ON signal to the ECU 10. Therefore, the step 206 is executed in order to determine whether the depression of the brake pedal 12 by the vehicle operator has been stopped. The step 206 is repeated until the result at the step 206 is affirmative.

When the result at the step 206 is affirmative, it is determined that the depression of the brake pedal 12 by the vehicle operator has been stopped. At this time, step 208 is executed by the ECU 10.

Step 208 detects whether the pressure Pmc detected by the Pmc sensor 30 is excessively lower than the pressure Pf detected by the Pf sensor 74.

Under the condition in which the closed-position defect in the MCV 36 does not occur, the MCV 36 is set at the open position and the flow of the brake fluid fed from the master cylinder 14 into the front hydraulic circuit 72 through the MCV 36 is allowed at the time the step 208 is executed. After the depression of the brake pedal 12 by the vehicle operator is stopped, the brake fluid pressure Pmc in the master cylinder 14 and the brake fluid pressure Pf in the front hydraulic circuit 72 are reduced in the same manner. Therefore, if the closed-position defect in the MCV 36 does not occur, the condition in which the pressure Pmc is excessively lower than the pressure Pf does not take place. At this time, the result at the step 208 is negative, and it is determined that the closed-position defect in the MCV 36 does not occur. After the step 208 is performed, the initial routine of FIG. 2 ends and the subsequent steps are not performed.

On the other hand, if the closed-position defect in the MCV 36 has occurred, the flow of the brake fluid fed from the master cylinder 14 into the front hydraulic circuit 72 is inhibited at the time the step 208 is executed. Even after the depression of the brake pedal 12 by the vehicle operator is stopped, the brake fluid pressure Pf in the front hydraulic circuit 72 is not reduced in the same manner as the brake fluid pressure Pmc in the master cylinder 14. Therefore, if the closed-position defect in the MCV 36 has occurred, the condition in which the pressure Pmc is excessively lower than the pressure Pf may take place. Further, in a case that the Pf sensor 74 is defective and continuously outputs a signal indicating a high level of the pressure Pf, the condition in which the pressure Pmc is excessively lower than the pressure Pf may take place. In such cases, the result at the step 208 is affirmative, and it is determined that the closed-position defect in the MCV 36 has occurred or the Pf sensor 74 is defective. After the step 208 is performed, step 210 is executed by the ECU 10.

Step 210 sets the pressure-down valves 90 and 92 at the open positions and sets the RVCV 96 at the open position. After the step 210 is performed, the flow of the brake fluid from the front hydraulic circuit 72 into the reservoir tank 28 through the pressure-down valves 90 and 92 and the RVCV 96 is allowed. The brake fluid pressure Pf in the front hydraulic circuit 72 is reduced to a pressure nearly equal to the atmospheric pressure. After the step 210 is performed, step 212 is executed by the ECU 10.

Step 212 detects whether the pressure Pmc detected by the Pmc sensor 30 is excessively lower than the pressure Pf detected by the Pf sensor 74. The step 212 is the same as the step 208. As described above, the brake fluid pressure Pf in the front hydraulic circuit 72 is reduced to the pressure nearly equal to the atmospheric pressure at the time the step 212 is performed.

When the result at the step 212 is affirmative under the above condition, it is determined that the Pf sensor 74 is defective. At this time, the step 204 is executed by the ECU 10. That is, the system failure flag is set in the ON state. After the step 204 is performed, the initial routine of FIG. 2 ends.

When the result at the step 212 is negative under the above condition, it is determined that the Pf sensor 74 normally operates. Therefore, the cause of the affirmative result at the step 208 is that the closed-position defect in the MCV 36 has occurred. That is, it is determined that, since the closed-position defect in the MCV 36 has occurred, the brake fluid pressure Pf in the front hydraulic circuit 72 is not reduced in the same manner as the brake fluid pressure Pmc in the master cylinder 14 at the time the step 208 is performed.

Therefore, when the result at the step 212 is negative, step 214 is executed by the ECU 10. Step 214 sets a closed-position defect flag in an ON state. After the step 214 is performed, the initial routine of FIG. 2 ends. According to the above-described initial routine, it is possible to make a determination as to whether the closed-position defect in the MCV 36 has occurred, each time the ignition switch is turned ON.

Figure 3:
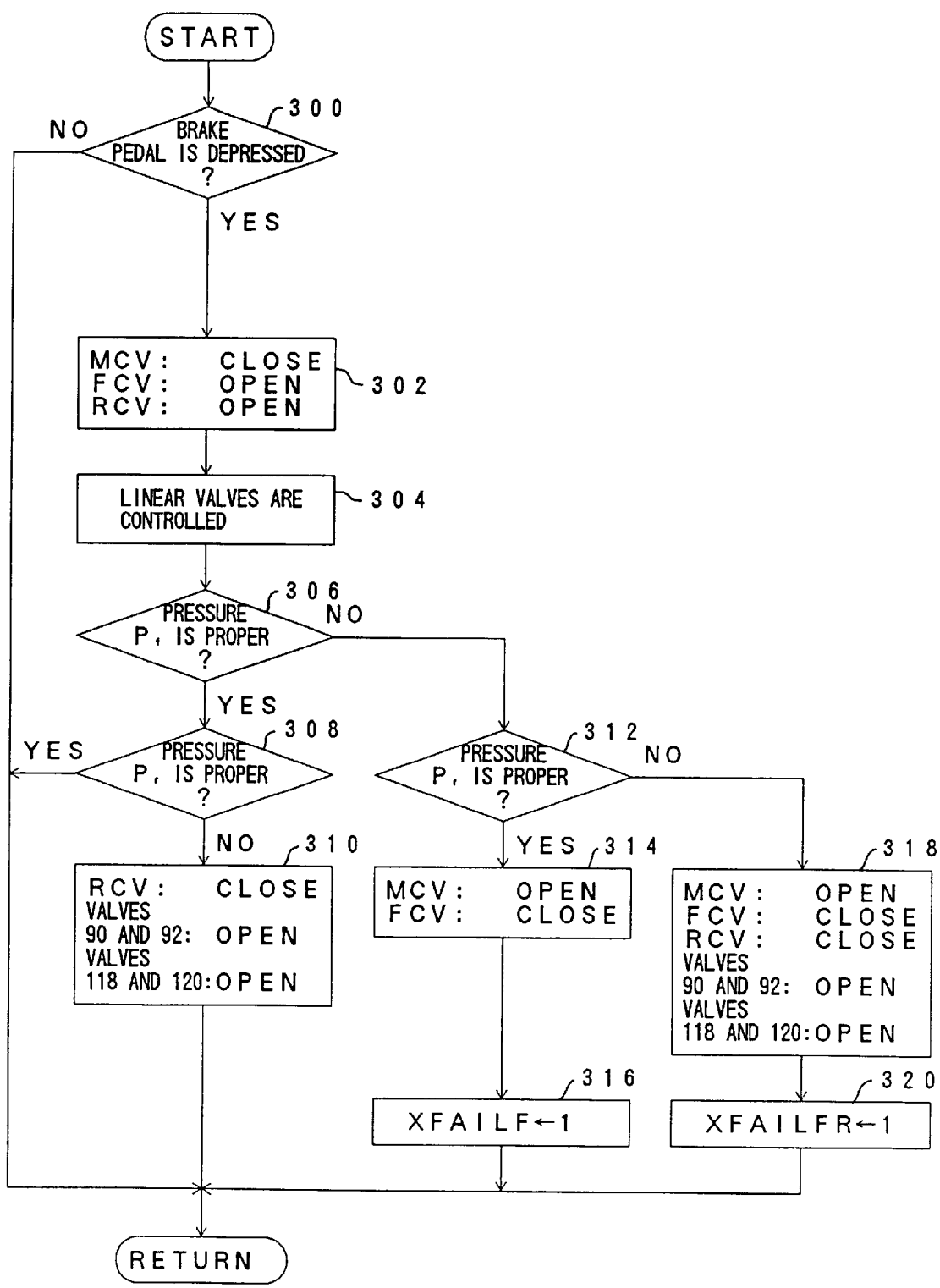
FIG. 3 is a flowchart for explaining a first control routine performed by the hydraulic brake control apparatus embodying the present invention.

FIG. 3 shows a first control routine of the hydraulic brake control process executed by the ECU 10 of the brake system of FIG. 1. The control routine of FIG. 3 is executed in order to carry out the normal control mode when the linear valves 58, 60, 66 and 68 normally operate, and to carry out an appropriate fail-safe function when the occurrence of defects in the linear valves 58, 60, 66 and 68 is detected.

The execution of the control routine of FIG. 3 is started by interrupts which are issued at regular time intervals.

As shown in FIG. 3, the ECU 10 at step 300 detects whether the brake pedal 12 is depressed by the vehicle operator. As described above, when the ON signal from the pressure switch 32 is supplied to the ECU 10 or when the pressure Pmc detected by the Pmc sensor 30 is higher than the reference level, it is detected that the brake pedal 12 is depressed by the vehicle operator.

When the result at the step 300 is negative, the subsequent steps are not performed and the first control routine at the present cycle ends. When the result at the step 300 is affirmative, step 302 is executed by the ECU 10.

Step 302 sets the MCV 36 at the closed position, sets the FCV 70 at the open position and sets the RCV 100 at the open position. The step 302 is performed to carry out the normal control mode. After the step 302 is performed, step 304 is executed by the ECU 10.

Step 304 controls the front linear valves 58 and 66 such that the pressure Pf (detected by the Pf sensor 74) is supplied by the front linear valves 58 and 66 and a ratio of the pressure Pf to the pressure Pmc (detected by the Pmc sensor 30) is set at a predetermined constant $\alpha_f$. Further, step 304 controls the rear linear valves 60 and 68 such that the pressure Pr (detected by the Pr sensor 98) is supplied by the rear linear valves 60 and 68 and a ratio of the pressure Pr to the pressure Pmc (detected by the Pmc sensor 30) is set at a predetermined constant $\alpha_r$. After the step 304 is performed, the equation $Pf=\alpha_f \cdot Pmc$ and the equation $Pr=\alpha_r \cdot Pmc$ are satisfied.

If the linear valves 58, 60, 66 and 68 normally operate, the pressure Pf, which is equal to the master cylinder pressure Pmc multiplied by the constant $\alpha_f$, is supplied by the front linear valves 58 and 66, and the pressure Pf from the front linear valves 58 and 66 is supplied to the front wheel cylinders 82 and 88 through the FCV 70. An adequately high level of the wheel cylinder pressure Pwc in the front wheel cylinders 82 and 88 can be produced by the supplied pressure Pf after the step 304 is performed. Further, the pressure Pr, which is equal to the master cylinder pressure Pmc multiplied by the constant $\alpha_r$, is supplied by the rear linear valves 60 and 68, and the pressure Pr from the rear linear valves 60 and 68 is supplied to the rear wheel cylinders 110 and 116 through the RCV 100. An adequately high level of the wheel cylinder pressure Pwc in the rear wheel cylinders 110 and 116 can be produced by the supplied pressure Pr after the step 304 is performed. After the step 304 is performed, step 306 is executed by the ECU 10.

Step 306 detects whether the pressure Pf detected by the Pf sensor 74 is at a proper level in comparison with the expected pressure "$\alpha_f \cdot Pmc$". That is, it is detected at the step 306 whether the condition: $\alpha_f \cdot Pmc - \beta \leq Pf \leq \alpha_f \cdot Pmc + \beta$ is satisfied. In the condition at the step 306, B is a predetermined value which is given by taking into account measurement errors of the Pf sensor 74 and the Pr sensor 98. When the result at the step 306 is affirmative, it is determined that a proper level of the brake fluid pressure Pf is supplied to the wheel cylinders 82 and 88 by the front linear valves 58 and 66. At this time, step 308 is executed by the ECU 10.

Step 308 detects whether the pressure Pr detected by the Pr sensor 98 is at a proper level in comparison with the expected pressure "$\alpha_r \cdot Pmc$". That is, it is detected at the step 308 whether the condition: $\alpha_r \cdot Pmc - \beta \leq Pr \leq \alpha_r \cdot Pmc + \beta$ is satisfied. When the result at the step 306 is affirmative, it is determined that a proper level of the brake fluid pressure Pr is supplied to the wheel cylinders 110 and 116 by the rear linear valves 60 and 68. At this time, it is determined that the hydraulic brake control apparatus normally operates. The subsequent steps are not performed, and the first control routine at the present cycle ends.

When the result at the step 308 is negative (or when the condition: $\alpha_r \cdot Pmc - \beta \leq Pr \leq \alpha_r \cdot Pmc + \beta$ is not satisfied), it is determined that a proper level of the brake fluid pressure Pf is supplied to the wheel cylinders 82 and 88 by the front linear valves 58 and 66 but a proper level of the brake fluid pressure Pr is not supplied to the wheel cylinders 110 and 116 by the rear linear valves 60 and 68. At this time, in order to carry out a fail-safe function against the defect in the rear linear valves 60 and 68, step 310 is executed by the ECU 10.

Step 310 sets the RCV 100 at the closed position, sets the pressure-down valves 90 and 92 at the open positions, and sets the pressure-down valves 118 and 120 at the open positions. After the step 310 is performed, the flow of the brake fluid fed from the rear linear valves 60 and 68 into the rear hydraulic circuit 102 is inhibited by the RCV 100, and the flow of the brake fluid fed from the front linear valves 58 and 66 into the rear hydraulic circuit 102 through the low-pressure passage 94 is allowed by the pressure-down valves 90, 92, 118 and 120.

Therefore, according to the step 310, even when the defect in the rear linear valves 60 and 68 has occurred, the proper level of the brake fluid pressure Pf is supplied to both the front wheel cylinders 82 and 88 and the rear wheel cylinders 110 and 116 by the front linear valves 58 and 66. An adequately high level of the wheel cylinder pressure Pwc in the front wheel cylinders 82 and 88 and an adequately high level of the wheel cylinder pressure Pwc in the rear wheel cylinders 110 and 116 can be produced by the supplied pressure Pf. After the step 310 is performed, the first control routine at the present cycle ends.

On the other hand, when the result at the step 306 is negative (or when the condition at the step 306: $\alpha_f \cdot Pmc - \beta \leq Pf \leq \alpha_f \cdot Pmc + \beta$ is not satisfied), it is determined that a proper level of the brake fluid pressure Pf is not supplied to the wheel cylinders 82 and 88 by the front linear valves 58 and 66. At this time, step 312 is executed by the ECU 10.

Step 312 detects whether he pressure Pr detected by the Pr sensor 98 is at a proper level in comparison with the expected pressure "$\alpha_r \cdot Pmc$". The step 312 is similar to the step 308, and it is detected at the step 312 whether the condition: $\alpha_r \cdot Pmc - \beta \leq Pr \leq \alpha_r \cdot Pmc + \beta$ is satisfied. When the result at the step 312 is affirmative, it is determined that a proper level of the brake fluid pressure Pr is supplied to the wheel cylinders 110 and 116 by the rear linear valves 60 and 68, but a proper level of the brake fluid pressure Pf is not supplied to the wheel cylinders 82 and 88 by the front linear valves 58 and 66. At this time, in order to carry out a fail-safe function against the defect in the front linear valves 58 and 66, step 314 is executed by the ECU 10.

Step 314 sets the MCV 36 at the open position and sets the FCV 70 at the closed position. Under a condition in which the closed-position defect in the MCV 36 does not occur, after the step 314 is performed, the flow of the brake fluid fed from the front linear valves 58 and 66 into the front hydraulic circuit 72 is inhibited by the FCV 70, and the flow of the brake fluid fed from the master cylinder 14 into the wheel cylinders 82 and 88 is allowed by the MCV 36.

Under a condition in which the closed-position defect in the MCV 36 has occurred, after the step 314 is performed, the flow of the brake fluid fed from the front linear valves 58 and 66 into the front hydraulic circuit 72 is inhibited by the FCV 70, and the flow of the brake fluid fed from the master cylinder 14 into the wheel cylinders 82 and 88 is allowed by the check valve 38 in the bypass passage of the defective MCV 36.

After the step 314 is performed, step 316 is executed by the ECU 10. Step 316 sets an error flag "XFAILF" at the value "1" (or in an ON state), which indicates that the defect in the front linear valves 58 and 66 has occurred. After the step 316 is performed, the first control routine at the present cycle ends.

Therefore, according to the steps 314 and 316, under the condition in which the closed-position defect in the MCV 36 does not occur, a proper level of the brake fluid pressure Pmc from the master cylinder 14 is supplied to the front wheel cylinders 82 and 88, and an adequately high level of the wheel cylinder pressure Pwc in the front wheel cylinders 82 and 88 can be produced by the supplied pressure Pmc. Under the condition in which the closed-position defect in the MCV 36 has occurred, according to the steps 314 and 316, the wheel cylinder pressure Pwc in the front wheel cylinders 82 and 88 can be increased to the level of the master cylinder pressure Pmc in the master cylinder 14 only when the wheel cylinder pressure Pwc is lower than the master cylinder pressure Pmc.

On the other hand, when the result at the step 312 is negative (or when the condition: $\alpha_r \cdot Pmc - \beta \leq Pr \leq \alpha_r \cdot Pmc + \beta$ is not satisfied), it is determined that a proper level of the brake fluid pressure Pr is not supplied to the wheel cylinders 110 and 116 by the rear linear valves 60 and 68 and a proper level of the brake fluid pressure Pf is not supplied to the wheel cylinders 82 and 88 by the front linear valves 58 and 66. At this time, step 318 is executed by the ECU 10.

Step 318 sets the MCV 36 at the open position, sets the FCV 70 and the RCV 100 at the closed positions, and sets the pressure-down valves 90, 92, 118 and 120 at the open positions. After the step 318 is performed, under the condition in which the closed-position defect in the MCV 36 does not occur, the flow of the brake fluid fed from the front linear valves 58 and 66 into the front hydraulic circuit 72 is inhibited by the FCV 70, and the flow of the brake fluid fed from the rear linear valves 60 and 68 into the rear hydraulic circuit 102 is inhibited by the RCV 100. Further, the flow of the brake fluid fed from the master cylinder 14 into the wheel cylinders 82 and 88 is allowed by the MCV 36, and the flow of the brake fluid fed from the master cylinder 14 into the wheel cylinders 110 and 116 through the low-pressure passage 94 is allowed by the pressure-down valves 90, 92, 118 and 120.

Under the condition in which the closed-position defect in the MCV 36 has occurred, after the step 314 is performed, the flow of the brake fluid fed from the front linear valves 58 and 66 into the front hydraulic circuit 72 is inhibited by the FCV 70, the flow of the brake fluid fed from the rear linear valves 60 and 68 into the rear hydraulic circuit 102 is inhibited by the RCV 100, the flow of the brake fluid fed from the master cylinder 14 into the wheel cylinders 82 and 88 is allowed by the check valve 38 in the bypass passage of the MCV 36, and the flow of the brake fluid fed from the master cylinder 14 into the wheel cylinders 110 and 116 is allowed by the pressure-down valves 90, 92, 118 and 120.

After the step 318 is performed, step 320 is executed by the ECU 10. Step 320 sets an error flag "XFAILFR" at the value "1" (or in an ON state), which indicates that the defect in the front linear valves 58 and 66 and the defect in the rear linear valves 60 and 68 have occurred. After the step 320 is performed, the first control routine at the present cycle ends.

Therefore, according to the steps 318 and 320, under the condition in which the closed-position defect in the MCV 36 does not occur, a proper level of the brake fluid pressure Pmc from the master cylinder 14 is supplied to the wheel cylinders 82, 88, 1110 and 116, and an adequately high level of the wheel cylinder pressure Pwc in the wheel cylinders 82, 88, 110 and 116 can be produced by the supplied pressure Pmc. Under the condition in which the closed-position defect in the MCV 36 has occurred, according to the steps 318 and 320, the wheel cylinder pressure Pwc in the wheel cylinders 82, 88, 110 and 116 can be increased to the level of the master cylinder pressure Pmc in the master cylinder 14 only when the wheel cylinder pressure Pwc is lower than the master cylinder pressure Pmc.

According to the above-described first control routine of FIG. 3, under the condition in which the closed-position defect in the MCV 36 does not occur, the supply of the pressure Pmc from the master cylinder 14 to the wheel cylinders 82, 88, 110 and 116 when the defect in the linear valves 58 and 66 has occurred or when the defects in the linear valves 58, 66, 60 and 68 have occurred, makes it possible to produce an adequately high level of the wheel cylinder pressure Pwc in the wheel cylinders 82, 88, 110 and 116.

However, under the condition in which the closed-position defect in the MCV 36 has occurred, according to the above-described first control routine of FIG. 3, it is impossible to control the wheel cylinder pressure Pwc in the wheel cylinders 82, 88, 110 and 116, when the defect in the linear valves 58 and 66 has occurred or when the defects in the linear valves 58, 66, 60 and 68 have occurred, such that the wheel cylinder pressure Pwc is reduced to the level of the master cylinder pressure Pmc in the master cylinder 14 if the wheel cylinder pressure Pwc is higher than the master cylinder pressure Pmc.

Figure 4:
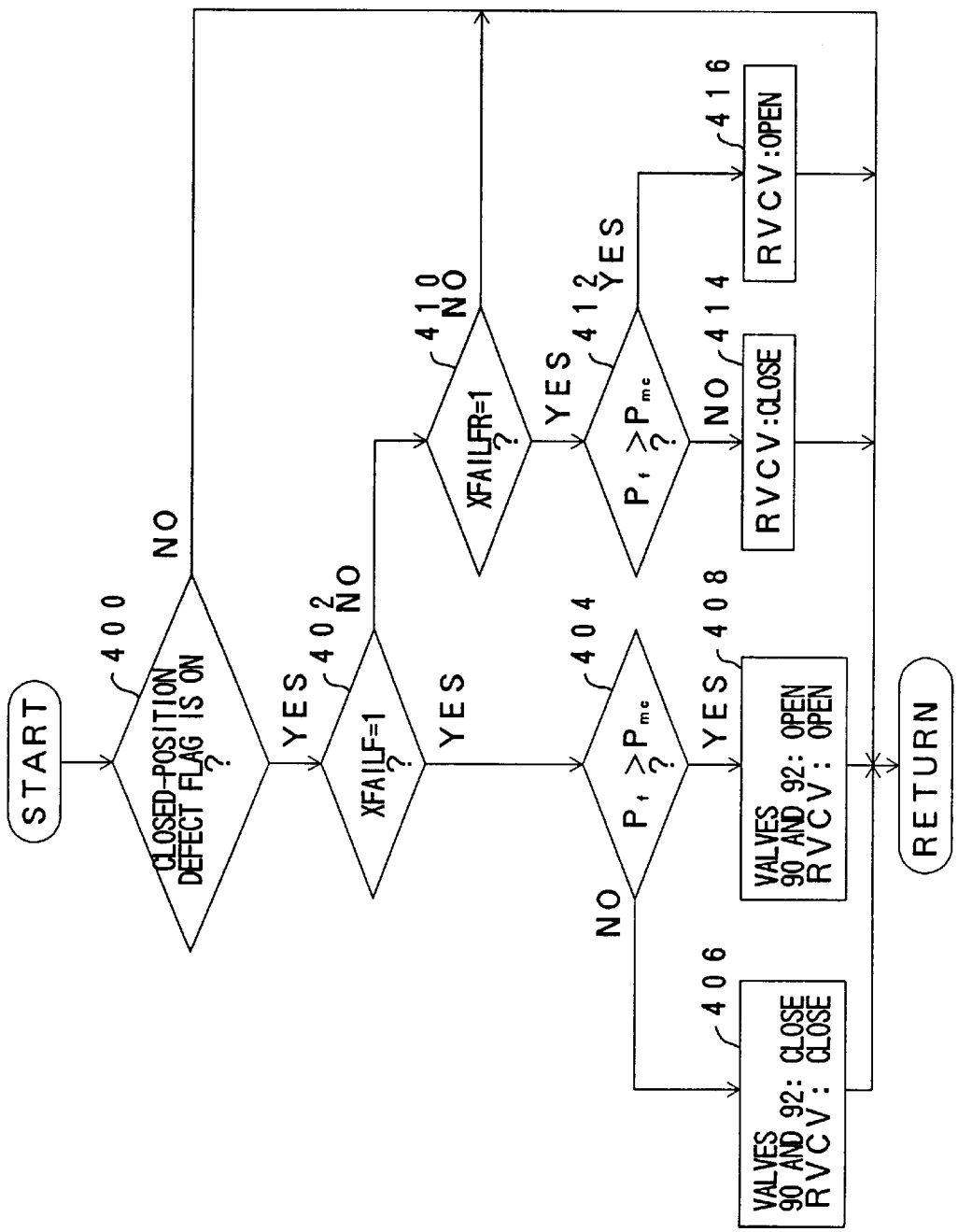
FIG. 4 is a flowchart for explaining a second control routine performed by the hydraulic brake control apparatus embodying the present invention.

FIG. 4 shows a second control routine of the hydraulic brake control process executed by the ECU 10 of the brake system of FIG. 1. The control routine of FIG. 4 is executed in order to carry out an appropriate fail-safe function against the defect in the linear valves 58 and 66 or against the defects in the linear valves 58, 66, 60 and 68 under the condition in which the closed-position defect in the MCV 36 has occurred.

The execution of the control routine of FIG. 4 is started by interrupts which are issued at regular time intervals.

As shown in FIG. 4, the ECU 10 at step 400 detects whether the closed-position defect flag is set in the ON state by the initial routine of FIG. 2. When the result at the step 400 is negative, it is determined that the closed-position defect in the MCV 36 does not occur. The subsequent steps are not performed, and the control routine at the present cycle ends.

When the result at the step 400 is affirmative, it is determined that the occurrence of the closed-position defect in the MCV 36 is detected. At this time, step 402 is executed by the ECU 10.

Step 402 detects whether the error flag "XFAILF" is set at the value "1" by the first control routine of FIG. 3. When the result at the step 402 is affirmative, it is determined that the occurrence of the defect in the front linear valves 58 and 66 is detected. At this time, step 404 is executed by the ECU 10.

Step 404 detects whether the pressure Pf (detected by the Pf sensor 74) is higher than the pressure Pmc (detected by the Pmc sensor 30). The step 404 is executed to make a determination as to whether the master cylinder pressure Pmc is decreasing.

When the condition: Pf>Pmc is not satisfied (or when Pf≦Pmc), it is determined that it is not necessary to reduce the wheel cylinder pressure Pwc in the wheel cylinders 82 and 88 to the level of the master cylinder pressure Pmc in the master cylinder 14. At this time, step 406 is executed by the ECU 10.

Step 406 sets the pressure-down valves 90 and 92 at the closed positions and sets the RVCV 96 at the closed position. After the step 406 is performed, the flow of the brake fluid fed from the master cylinder 14 into the wheel cylinders 82 and 88 is allowed by the check valve 38 in the bypass passage of the MCV 36. In this condition, since the pressure Pmc is higher than the brake fluid pressure Pf in the front hydraulic circuit 72, the brake fluid pressure Pf in the front hydraulic circuit 72 is increased to the level of the master cylinder pressure Pmc by the supply of the brake fluid from the master cylinder 14 to the wheel cylinders 82 and 88 through the check valve 38. After the step 406 is performed, the second control routine at the present cycle ends.

On the other hand, when the condition at the step 404: Pf>Pmc is satisfied, it is determined that the master cylinder pressure Pmc is decreasing and it is necessary to reduce the wheel cylinder pressure Pwc in the wheel cylinders 82 and 88 to the level of the level of the master cylinder pressure Pmc. At this time, step 408 is executed by the ECU 10.

Step 408 sets the pressure-down valves 90 and 92 at the open positions and sets the RVCV 96 at the open position. After the step 408 is performed, the flow of the brake fluid fed from the wheel cylinders 82 and 88 into the reservoir tank 28 through the return passage 97 is allowed by the valves 90 and 92 and the RVCV 96. This condition of the brake system is maintained until the result at the step 404 is negative. Therefore, the wheel cylinder pressure Pwc in the wheel cylinders 82 and 88 will be reduced to the level of the level of the master cylinder pressure Pmc in the master cylinder 14 by the supply of the brake fluid from the wheel cylinders 82 and 88 to the reservoir tank 28 through the low-pressure passage 94. After the step 408 is performed, the second control routine at the present cycle ends.

Therefore, according to the steps 400 through 408, when the occurrence of the defect in the linear valves 58 and 66 is detected under the condition in which the closed-position defect in the MCV 36 has occurred, the pressure Pwc in the wheel cylinders 82 and 88 can be appropriately adjusted to be equal to the pressure Pmc supplied by the master cylinder 14. Accordingly, it is possible for the hydraulic brake control apparatus of the above-described embodiment to carry out an appropriate fail-safe function against the defect in the linear valves 58 and 66 under the condition in which the closed-position defect in the MCV 36 has occurred.

When the result at the step 402 is negative, it is determined that the occurrence of the defect in the front linear valves 58 and 66 is not detected. At this time, step 410 is executed by the ECU 10.

Step 410 detects whether the error flag "XFAILFR" is set at the value "1" by the first control routine of FIG. 3. When the result at the step 410 is negative, it is determined that the occurrence of the defects in the linear valves 58, 66, 60 and 68 is not detected. The subsequent steps are not performed and the second control routine at the present cycle ends.

When the result at the step 410 is affirmative, it is determined that the occurrence of the defects in the linear valves 58, 66, 60 and 68 is detected. At this time, step 412 is executed by the ECU 10.

Step 412 detects whether the pressure Pf (detected by the Pf sensor 74) is higher than the pressure Pmc (detected by the Pmc sensor 30). The step 412 is similar to the step 404. When the condition: Pf>Pmc is not satisfied (or when Pf≦Pmc), it is determined that it is not necessary to reduce the wheel cylinder pressure Pwc in the wheel cylinders 82, 88, 110 and 116 to the level of the master cylinder pressure Pmc in the master cylinder 14. At this time, step 414 is executed by the ECU 10.

Step 414 sets the RVCV 96 at the closed position. Before the step 414 is performed, the FCV 70 and the RCV 100 are set at the closed positions, and the pressure-down valves 90, 92, 118 and 120 are set at the open positions in the first control routine of FIG. 3. After the step 414 is performed, the flow of the brake fluid fed from the master cylinder 14 into the wheel cylinders 82, 88, 110 and 116 is allowed by the check valve 38 in the bypass passage of the MCV 36. In this condition, since the pressure Pmc is higher than the brake fluid pressure Pf in the front hydraulic circuit 72, the brake fluid pressure Pf in the front hydraulic circuit 72 and the brake fluid pressure Pr in the rear hydraulic circuit 102 are increased to the level of the master cylinder pressure Pmc by the supply of the brake fluid from the master cylinder 14 to the wheel cylinders 82, 88, 110 and 116 through the check valve 38. After the step 414 is performed, the second control routine at the present cycle ends.

On the other hand, when the condition at the step 412: Pf>Pmc is satisfied, it is determined that it is necessary to reduce the wheel cylinder pressure Pwc in the wheel cylinders 82, 88, 110 and 116 to the level of the level of the master cylinder pressure Pmc in the master cylinder 14. At this time, step 416 is executed by the ECU 10.

Step 416 sets the RVCV 96 at the open position. After the step 416 is performed, the flow of the brake fluid fed from the wheel cylinders 82, 88, 110 and 116 into the reservoir tank 28 through the low-pressure passage 94 is allowed by the RVCV 96. This condition of the brake system is maintained until the result at the step 412 is negative. Therefore, the wheel cylinder pressure Pwc in the wheel cylinders 82, 88, 110 and 116 will be reduced to the level of the level of the master cylinder pressure Pmc in the master cylinder 14 by the supply of the brake fluid from the wheel cylinders 82, 88, 110 and 116 to the reservoir tank 28 through the low-pressure passage 94. After the step 416 is performed, the second control routine at the present cycle ends.

Therefore, according to the steps 410 through 416, when the occurrence of the defects in the linear valves 58, 66, 60 and 68 is detected under the condition in which the closed-position defect in the MCV 36 has occurred, the wheel cylinder pressure Pwc in the wheel cylinders 82, 88, 110 and 116 can be appropriately adjusted to be equal to the brake fluid pressure Pmc supplied by the master cylinder 14. Accordingly, it is possible for the hydraulic brake control apparatus of the above-described embodiment to carry out an appropriate fail-safe function against the defects in the linear valves 58, 66, 60 and 68 under the condition in which the closed-position defect in the MCV 36 has occurred.

In the above-described control routine of FIG. 4, the determination as to whether the master cylinder pressure Pmc is decreasing is made based on a measured value of the pressure Pf from the Pf sensor 74 in comparison with a measured value of the pressure Pmc from the Pmc sensor 30. Alternatively, the determination as to whether the master cylinder pressure Pmc is decreasing may be made based on a measured value of the pressure Pmc from the Pmc sensor 30 and an estimated rate of change of the pressure Pmc from the Pmc sensor 30. In the alternative method, when the estimated rate of change of the pressure Pmc from the Pmc sensor 30 is smaller than zero (or negative), it is determined that the master cylinder pressure Pmc is decreasing.

In the above-described embodiment of the brake system of FIG. 1, the master cylinder 14 is connected to the wheel cylinders via the MCV 36, and the linear valves 58, 66, 60 and 68 are connected to the wheel cylinders via the FCV 70 and the RCV 100. However, the present invention is not limited to the above-described embodiment. For example, the present invention can be also applied to a hydraulic brake control apparatus in which a master cylinder cut valve is provided to inhibit a flow of brake fluid between a master cylinder and an ABS (anti-lock brake system) actuator when an ABS control is carried out. When the ABS control is carried out in this hydraulic brake control apparatus, a pulsation of an ABS pump may be transmitted to a brake pedal. The master cylinder cut valve inhibits the flow of the brake fluid between the master cylinder and the ABS actuator in order to prevent the pulsation of the ABS pump from being transmitted to the brake pedal.

Further, the present invention is not limited to the above-described embodiment, and variations and modifications may be made without departing from the present invention.

What is claimed is:

1. A hydraulic brake control apparatus in which a master cylinder is connected to wheel cylinders via a master cylinder cut valve, and the wheel cylinders are connected to a reservoir tank via a switching valve, said apparatus comprising:

a check valve provided between the master cylinder and the wheel cylinders in parallel with the master cylinder cut valve, the check valve provided in a bypass passage of the master cylinder cut valve, the check valve allowing a flow of a brake fluid from the master cylinder to the wheel cylinders and inhibiting a flow of the brake fluid from the wheel cylinders to the master cylinder; and a valve control unit for controlling the switching valve when it is detected that a closed-position defect in the master cylinder cut valve has occurred and a pressure of the brake fluid in the master cylinder is decreasing, so that the switching valve is set at an open position to allow a flow of the brake fluid from the wheel cylinders to the reservoir tank through the switching valve and reduce a pressure of the brake fluid in the wheel cylinders.

2. The apparatus according to claim 1, further comprising a closed-position defect detecting unit for making a determination that the closed-position defect in the master cylinder cut valve has occurred, when the pressure of the brake fluid in the wheel cylinders is not decreasing after the pressure of the brake fluid in the master cylinder has been decreased under a condition in which the master cylinder cut valve is set at an open position to allow the flow of the brake fluid from the master cylinder to the wheel cylinders.

3. The apparatus according to claim 1, wherein the valve control unit controls the switching valve when it is detected that the closed-position defect in the master cylinder cut valve has occurred and a measured pressure of the brake fluid in the wheel cylinders is not higher than a measured pressure of the brake fluid in the master cylinder, so that the switching valve is set at a closed position to inhibit the flow of the brake fluid from the wheel cylinders to the reservoir tank through the switching valve, and the check valve allows the flow of the brake fluid from the master cylinder to the wheel cylinders.

4. The apparatus according to claim 1, wherein the wheel cylinders include front wheel cylinders and rear wheel cylinders, and wherein said apparatus further comprises a pressure supplying device for supplying a brake fluid pressure responsive to a drive signal to the wheel cylinders, said pressure supplying device comprising a pump with an actuating motor, front linear valves connected to the front wheel cylinders via a front cut valve, and rear linear valves connected to the rear wheel cylinders via a rear cut valve.

5. The apparatus according to claim 4, wherein the valve control unit controls the switching valve when it is detected that, under a condition in which the closed-position defect in the master cylinder cut valve has occurred, both a defect in the front linear valves and a defect in the rear linear valves have occurred and a measured pressure of the brake fluid in the wheel cylinders is not higher than a measured pressure of the brake fluid in the master cylinder, so that the switching valve is set at a closed position to inhibit the flow of the brake fluid from the wheel cylinders to the reservoir tank through the switching valve, and the check valve allows the flow of the brake fluid from the master cylinder to the wheel cylinders.

6. The apparatus according to claim 4, wherein the valve control unit controls the switching valve when it is detected that, under a condition in which the closed-position defect in the master cylinder cut valve has occurred, both a defect in the front linear valves and a defect in the rear linear valves have occurred and a measured pressure of the brake fluid in the wheel cylinders is higher than a measured pressure of the brake fluid in the master cylinder, so that the switching valve is set at the open position to allow the flow of the brake fluid from the wheel cylinders to the reservoir tank through the switching valve and reduce the pressure of the brake fluid in the wheel cylinders.

7. The apparatus according to claim 2, wherein the closed-position defect detecting unit detects, before the determination is made, that a measured pressure of the brake fluid in the master cylinder and a measured pressure of the brake fluid in the wheel cylinders are at proper levels.

8. The apparatus according to claim 2, wherein the closed-position defect detecting unit sets the switching valve at the open position, before the determination is made, so that the flow of the brake fluid from the wheel cylinders to the reservoir tank through the switching valve is allowed to reduce the pressure of the brake fluid in the wheel cylinders.

9. The apparatus according to claim 1, wherein the switching valve includes a reservoir tank cut valve provided in a return passage between the wheel cylinders and the reservoir tank and a plurality of pressure-down valves provided between the wheel cylinders and the reservoir tank cut valve.

10. The apparatus according to claim 1, further comprising a wheel cylinder pressure sensor for outputting a signal indicative of a brake fluid pressure in the wheel cylinders, and a master cylinder pressure sensor for outputting a signal indicative of a brake fluid pressure in the master cylinder.

* * * * *